(12) United States Patent
Arendt et al.

(10) Patent No.: US 10,997,001 B2
(45) Date of Patent: May 4, 2021

(54) EVENT INFORMATION PROCESSING SYSTEM

(71) Applicant: American Express Travel Related Services Company, Inc., New York, NY (US)

(72) Inventors: James Arendt, Bradenton, FL (US); Scott F. Brown, Land O Lakes, FL (US); Paul Byran Demiduk, Gulfport, FL (US); Charles Russell O'Keefe, Tampa, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 16/529,515

(22) Filed: Aug. 1, 2019

(65) Prior Publication Data
US 2021/0034440 A1 Feb. 4, 2021

(51) Int. Cl.
*G06F 15/173* (2006.01)
*G06F 9/54* (2006.01)
*G06F 11/30* (2006.01)

(52) U.S. Cl.
CPC .......... *G06F 9/542* (2013.01); *G06F 11/3006* (2013.01); *G06F 11/3086* (2013.01)

(58) Field of Classification Search
CPC ... G06F 9/542; G06F 11/3006; G06F 11/3086
USPC ........................................................ 709/224
See application file for complete search history.

(56) References Cited

U.S. PATENT DOCUMENTS

| 2012/0158843 | A1* | 6/2012 | Angani | G06Q 30/02 709/204 |
| 2020/0244680 | A1* | 7/2020 | Brandel | G06F 16/245 |

* cited by examiner

*Primary Examiner* — Wing F Chan
*Assistant Examiner* — Joseph R Maniwang
(74) *Attorney, Agent, or Firm* — Thomas | Horstemeyer, LLP

(57) ABSTRACT

The method includes receiving event information for a plurality of events from a plurality of data sources; normalizing the event information for each event of the plurality of events into a desired format by at least one of changing a field name of the event information or transforming at least one value in the event information into a recognized value; enriching the event information for each event of the plurality of events by adding additional data points associated with the event information to the event information; and/or transmitting the event information to a data recipient.

20 Claims, 2 Drawing Sheets

EVENT INFORMATION PROCESSING SYSTEM

FIELD

The present disclosure generally relates to event information intake and processing.

BACKGROUND

Data processing systems may receive from many sources data and information regarding various events that take place. For example, a data system monitoring the health of various data sources (e.g., other systems) providing services to customers may receive and process data and information from those data sources, such that the data system may determine their functional welfare. The data received from the multiple data sources may vary in format depending on the data type, associated event, source, and/or the like, such that aggregation and/or processing of the event data by one system may be difficult. Also, if event data is processed by multiple data systems, obtaining uniformity among the data (e.g., in format), or tailoring the data processing in a uniform manner, may be difficult.

SUMMARY

A system, method, and article of manufacture (collectively, "the system") are disclosed relating to data management. In various embodiments, the system may perform operations including receiving, by a processor, event information for a plurality of events from a plurality of data sources; normalizing, by the processor, the event information for each event of the plurality of events into a desired format by at least one of changing a field name of the event information or transforming at least one value in the event information into a recognized value; enriching, by the processor, the event information for each event of the plurality of events by adding additional data points associated with the event information to the event information; and/or transmitting, by the processor, the event information to a data recipient. In various embodiments, the desired format may be a common format for normalized event information.

In various embodiments, the operations may further comprise analyzing, by the processor, the enriched event information for each event of the plurality of events for desired characteristics of the enriched event information for each event; and/or displaying, by the processor, values for the desired characteristics in response to the analyzing the enriched event information for the desired characteristics. In various embodiments, the operations may further comprise implementing, by the processor, a microservices configuration in which at least one of the normalization microservice, the enrichment microservice, or the dispatch microservice is deactivated, such that the event pipeline may not perform functions of the deactivated at least one of the ingestion microservice, the normalization microservice, the enrichment microservice, or the dispatch microservice. In various embodiments, the operations may further comprise comparing, by the processor, the event information for each event of the plurality of events to historical event information associated with the event information; and matching, by the processor, a data characteristic of the event information for each event of the plurality of events with a historical event characteristic of a historical event comprised in the historical event information. The historical event information matched with the event information is comprised in the additional data points added to the event information in the enriching the event information for each event of the plurality of events. In various embodiments, the operations may further comprise determining, by the processor, an ingestion data quality score for the received event information for each event of the plurality of events prior to the normalizing the event information; and/or determining, by the processor, an enrichment data quality score for the enriched event information for each event of the plurality of events.

In various embodiments, the receiving the event information occurs via an ingestion microservice of an event pipeline, wherein the normalizing the event information occurs via a normalization microservice of the event pipeline, and wherein the enriching the event information occurs via the enrichment microservice.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1:
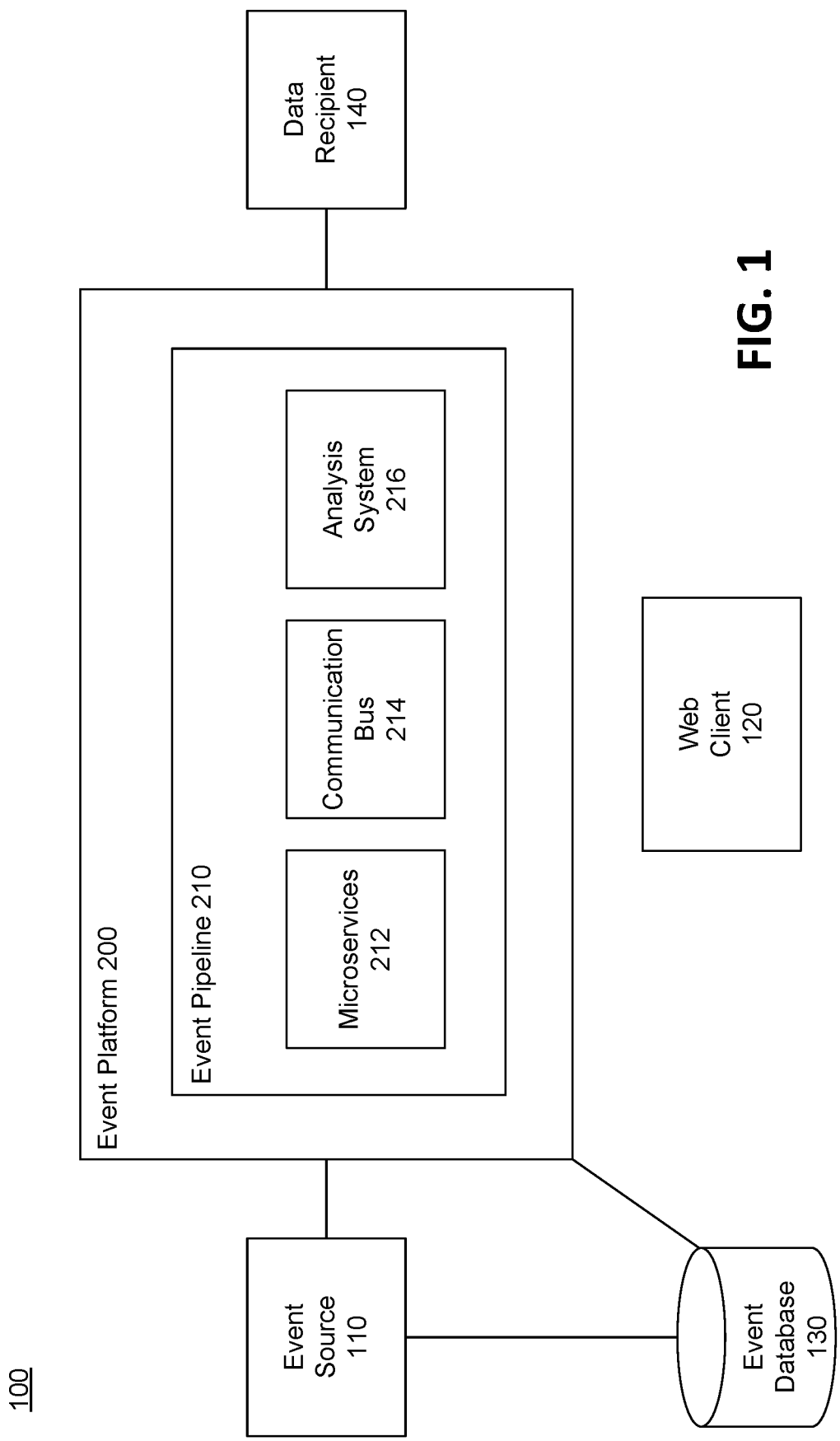
FIG. 1 shows an exemplary event information processing system, in accordance with various embodiments.

With reference to FIG. 1, in accordance with various embodiments, an exemplary event information processing system 100 is depicted. System 100 may comprise an event source 110, a web client 120, an event database 130, an event platform 200, and/or a data recipient 140. In various embodiments, system 100 may comprise more than one of each component, e.g., more than one event source 110, web client 120, event database 130, event platform 200, and/or data recipient 140. In operation, system 100 (and/or its components) may be configured to receive data from multiple event sources 110 and perform various processing tasks or microservices on the data received. System 100, and any of the components comprised therein, may be computer-based, and may comprise a processor, a tangible non-transitory computer-readable memory, and/or a network interface. Instructions stored on the tangible non-transitory memory may allow system 100 or any of its components to perform various functions, as described herein.

In various embodiments, event source 110 may comprise hardware and/or software components. For example, event source 110 may comprise a server appliance running a suitable server operating system (e.g., MICROSOFT INTERNET INFORMATION SERVICES or, "IIS") and having database software (e.g., ORACLE) installed thereon. In various embodiments, event source 110 may be an entity or system at which events occur. Events may include any happening for which the associated event source 110 receives event information, for example, completion of a transaction using a transaction instrument (e.g., a credit card), the exchange of information between event sources 110, detection of fraudulent use of a transaction instrument, changes to consumer and/or merchant profiles, preferences, practices, etc., the availability and/or performance of system services or applications, measures of various values, communications between devices and/or systems, and/or the like. In various embodiments, system 100 may comprise multiple or many event sources 110 which transmit event information to event platform 200 and/or event pipeline 210 comprised in event platform 200. The aggregate data received by event platform 200 from event source(s) 110 may be big data.

The event information for each event received by event platform 200 from event source 110 may comprise various data characteristics such as, for example, a data format (e.g., JSON), a file size, data quality, event type, an event source (i.e., an identifier of the event source 110), arrival time, arrival frequency, entities or systems involved in the event, transaction information associated with a completed transaction (e.g., transaction date, time, location, monetary amount, product or service sold, transaction instrument used, etc.), and/or the like. Data characteristics (e.g., in JSON format) may be data points within the event information indicating or identifying the event and associated characteristics. Each event source 110 (in embodiments in which system 100 comprises multiple event sources 110) may transmit data to event platform 200 having a data characteristic(s) specific to the respective event source 110 and/or the event type. In various embodiments, data from a single event source 110 may comprise different data characteristics.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with a network (e.g., a personal computer, personal digital assistant (e.g., IPHONE®, BLACKBERRY®), tablet, cellular phone, kiosk, telephone, and/or the like). Web client 120 may be in electronic communication with event source 110, event database 130, event platform 200, and/or data recipient 140.

Web client 120 includes any device (e.g., personal computer, mobile device, telephone, etc.) which communicates via any network, for example such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with a server via a network by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel.

In various embodiments, event database 130 may incorporate hardware and/or software components. For example, event database 130 may comprise a server appliance running a suitable server operating system. Event database 130 may comprise historical event information associated with past events from event source(s) 110 for analysis and reference by event platform 200 and/or the components comprised therein. As discussed, the event information associated with past events may comprise data characteristics reflecting and describing the associated event. Event database 130 may be in electronic communication with event source 110, web client 120, event platform 200, and/or data recipient 140.

In various embodiments, event platform 200 may comprise hardware and/or software capable of receiving, processing, analyzing, distributing, and/or storing data. For example, event platform 200 may comprise a server appliance running a suitable server operating system and having database software (e.g., ORACLE) installed thereon. Event platform 200 may be in electronic communication with event source 110, web client 120, event database 130 and/or data recipient 140. In various embodiments, event platform 200 may comprise an event pipeline 210. Event pipeline 210 may receive event information from event source(s) 110 for processing, manipulation, distribution, and/or the like. In various embodiments, event pipeline 210 may comprise microservices 212, a communication bus 214, and/or an analysis system 216, described further herein. In various embodiments, the components of event platform 200 may be configured to operate as part of event platform 200 and/or be in electronic communication with one another and/or any component of system 100.

In various embodiments, microservices 212 may comprise various microservices (e.g., systems) which perform the functions of event platform 200 and/or event pipeline 210 on event information. For example, the microservices comprised in microservices 212 may include an ingestion microservice, a normalization microservice, an enrichment microservice, a data quality assessment microservice, a dispatch service, a ticket microservice, and/or the like. Microservices 212 in event pipeline 210 provide discrete services and functions for processing, manipulating, and/or analyzing of event information. Therefore, if something goes wrong within event pipeline 210, addressing the issue may be more efficient because the appropriate microservice may be easily identified and/or disabled for repair adjusted without affecting the other microservices 212. Also, a certain configuration of microservices 212 may be selected and implemented for processing certain event information. For example, for certain event information (e.g., event information received from a certain event source 110), only ingestion and normalization may be necessary. Therefore, a microservice configuration utilizing only the ingestion microservice and normalization microservice may be toggled on (i.e., enabled for use in processing), and the enrichment microservice and the data quality assessment microservice (and any other microservice 212 besides the ingestion and normalization microservices) may be deactivated to process such event information. Accordingly, each microservice 212 may be activated or deactivated independently of the other microservices 212, for example, by selecting a desired microservice configuration and/or manually toggling each microservice on or off.

The ingestion microservice may be configured to receive event information from event source 110 into event pipeline 210 by, for example, electronic communication (e.g., via an application program interface (API)) between event source 110 and event platform 200 and/or event pipeline 210. The normalization microservice may be configured to manipulate or alter the event information received from event source 110 into a desired format. The desired format may be a common format which all normalized event information (i.e., event information received from any event source 110 that has been processed by the normalization microservice) may assume. Normalizing event information into a desired format may comprise, for example, changing a field name of the event information (e.g., transforming data into different field names) or transforming a data value in the event information into a data value that is recognized within event platform 200 and/or event pipeline 210. The enrichment microservice may be configured to enrich event information received by event pipeline 210 from event source 110. Enriching event information received by event pipeline 210 may comprise augmenting the information by including additional data points, data titles, etc., as explained further in relation to method 250 of FIG. 2. The data quality assessment microservice may be configured to assess the data quality of event information at one or more times during the processing or manipulation of event information within event pipeline 210. For example, the data quality assessment microservice may assess the data quality of event information received from event source 110 by event pipeline 210 before any processing or altering begins in event pipeline 210 by, for example, microservices 212. As another example, the data quality assessment microservice may assess the data quality of event information enriched by the enrichment microservice (i.e., enriched event information). The assessment of data quality will be further discussed in relation to method 250 of FIG. 2. The dispatch microservice may be configured to forward or transmit event information, which may have been received from event source 110 and/or processed in event pipeline 210, to a desired data recipient 140. The ticket microservice may be configured to transmit event tickets and/or event information to a desired data recipient 140, e.g., for events that require immediate awareness and action from a user of event pipeline 210 and/or event platform 200 and/or data recipient 140. A ticket may comprise the subject event, the associated event information, a detected issue, and/or a necessary action for a user or the system to take, for example. In various embodiments, the ticket microservice may allow components or systems external to event pipeline 210 and/or event platform 200 to manage and/or monitor ticket lifecycle for events and associated event information. A ticket lifecycle may include status codes or states indicating the status of a ticket. For example, a ticket lifecycle may include ticket creation, updates based on the status of a ticket (such as the issue described in the ticket being investigated, acted upon, and/or resolved in the respective event source 110), and/or closing after the ticket and any issues/actions therein have been addressed or resolved.

In various embodiments, communication bus 214 may facilitate the flow of information (e.g., event information) through event pipeline 210, event platform 200, and/or the other components of system 100. Therefore, communication bus 214 may be in electronic and/or logical communication with the other components of event pipeline 210, and/or any components of system 100. As such, each such component may interoperate via communication bus 214 by transceiving messages and information, and may perform various calculations, decisions, and operations in accordance with the teachings herein. Moreover, event platform 200, event pipeline 210, and/or communication bus 214 may comprise a bus controller (e.g., which may be integral with communication bus 214) configured to manage communications among components in communication bus 214, direct various components of event platform 200 and/or event pipeline 210 to perform various operations and processes in accordance with methods disclosed herein, as well as direct communications with components external to event platform 200 such as distributed event source 110, web client 120, event database 130, data recipient 140, and/or the like.

In various embodiments, analysis system 216 may incorporate hardware and/or software components. For example, data recipient 140 may comprise a server appliance running a suitable server operating system. Analysis system 216 may be configured to analyze the event information received and/or processed by event pipeline 210 to determine certain data characteristics of the event information and/or values associated with data characteristics comprised in the event information. For example, analysis system 216 may determine the number or frequency of certain event types (the event type being the data characteristic of the event information associated with each event, and the number of event types being the value for the data characteristic). Analysis system 216 may also be configured to display the results of the analysis to a user of system 100 and/or event platform 200 (e.g., on a display screen comprised in web client 120).

In various embodiments, data recipient 140 may incorporate hardware and/or software components. For example, data recipient 140 may comprise a server appliance running a suitable server operating system. Data recipient 140 may be any system or entity which may receive and/or utilize the event information processed and/or manipulated (e.g., normalized and/or enriched) by event pipeline 210, and/or utilize information associated with such event information.

Figure 2:
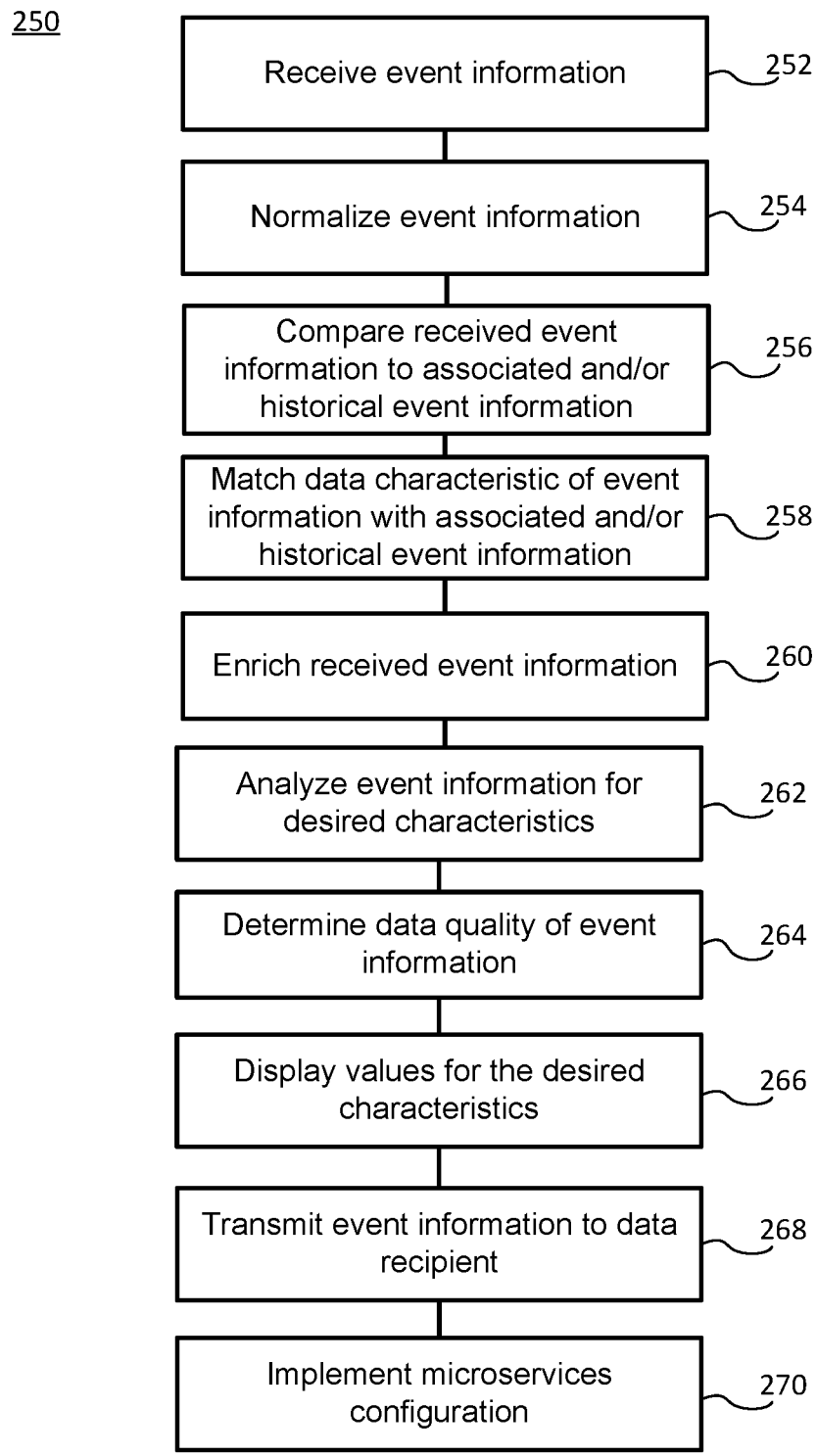
FIG. 2 shows a flowchart depicting an exemplary method for processing event information, in accordance with various embodiments.

In accordance with various embodiments, FIG. 2 depicts a method 250 for processing event information. With combined reference to FIGS. 1 and 2, event platform 200 and/or event pipeline 210 may receive event information (step 252) from event source 110. Event information may comprise different formats, for example, depending on the event source 110 from which the event information is received (e.g., Netcool/Omnibus, ICinga, Spectrum, Dynatrace AppMon, Gomez, AppDynamics, Generic REST Event, and/or Journey REST Event). The event information may be associated with one or more events that have taken place (i.e., completion of a transaction, application for a transaction instrument, transfer of data between systems, or any other happening for which the respective event source 110 obtains and/or generates event information). The event information may comprise data characteristics which describe or characterize the information and/or the associated event. Event source 110 may be an entity (e.g., a merchant, consumer having a consumer profile, a system, etc.) at which, or which are involved in, events that may take place. In various embodiments, event platform 200 and/or event pipeline 210 may receive event information from event source 110 periodically (i.e., once per day), or in real time or near real time (e.g., within five minutes of an event taking place or event source 110 receiving new event information). As described herein, system 100 may comprise multiple event sources 110, from which event platform 200 and/or event pipeline 210 may receive event information associated with one or more events.

Event source 110 may be in electronic communication with event platform 200 and/or event pipeline 210, for example, via an API, such that data/information may be transmitted between such components of system 100. In various embodiments, event source 110 may transmit event information associated with one or more events to event platform 200 and/or event pipeline 210. In various embodiments, event platform 200 and/or event pipeline 210 may pull event information associated with one or more events from event source 110.

In various embodiments, event pipeline 210 may process and/or manipulate the received event information associated with one or more events via microservices 212 comprised in event pipeline 210. Receiving event information (step 252) by event platform 200 and/or event pipeline 210 may be completed via an ingestion microservice of microservices 212. The ingestion microservice, in receiving and/or ingesting event information, may perform various functions. In various embodiments, the ingestion microservice may parse the incoming event information into different categories (e.g., event type, date, etc.). For example, received event information may be parsed into event types, such as alerts or durational measures. In various embodiments, the ingestion microservice may perform minimal validation of the received event information to make sure such information is capable of processing by event pipeline 210 (e.g., of sufficient quality, readable format, etc.). In response to event information not being validated (e.g., the data is malformed or invalid), the ingestion microservice may route such event information to a discard microservice, which may compare details of the event information and terminate normal event pipeline 210 processing of such information. In various embodiments, the ingestion microservice may perform minimal data transformation (e.g., normalization) on the received event information so event pipeline 120 processing after ingestion may not be required to understand and/or process such aspects of event information.

In various embodiments, a normalization microservice of microservices 212 may normalize the event information (step 254) received by event pipeline 210. Normalization maps disparate incoming event information from different event sources 110 into a common internal format so that event pipeline 210 processing of the events is uniform. Additionally, normalization enables disparate values in received event information to be mapped or transformed into common values which helps uniform processing data consistency. That is, event information may be received by event pipeline 210 in an event source format (i.e., the format of the event information provided by the respective event source 110), and the normalization microservice may alter the event information format to a desired format(s) (e.g., an internal event format that is common among some or all normalized event information). For example, event information from event source 110 may be received by event pipeline 210 entitled "event name," and the normalization microservice may alter the event information such that the title is "event name and description." Normalization may affect all event information associated with an event, or at least one piece of event information associated with an event. As another example, the normalization microservice may transform values of data characteristics comprised in the event information to a recognized value (i.e., a value used internally in event platform 200 and/or event pipeline 210). As yet another example, date/time event information may be represented differently depending on the event source 110, the event type, or the like. In response, the normalization microservice may transform dates and/or date/time stamps to a uniform format (e.g., coordinated universal time). As yet another example, written characters in received event information may comprise upper and/or lower case characters, so normalization may, for example, normalize all characters to upper case characters.

Normalizing the format of incoming event information from event source(s) 110 decreases or removes the possibly disparate nature of the incoming event information format. Therefore, processing of such normalized event information becomes more uniform, efficient, and predictable because all event information being further processed in event pipeline 210 will be similarly processed or analyzed. That is, the models and/or parameters with which a system (e.g., event platform 200 and/or event pipeline 210) processes event information may remain constant or uniform while processing incoming event information from event source(s) 110 (i.e., the processing models and/or parameters need not be adjusted for each data format specific to, for example, a certain event, event information, or event source 110).

In various embodiments, event pipeline 210 may enrich received event information (step 260) (e.g., normalized event information) via an enrichment microservice of microservices 212. In various embodiments, enriching event information may comprise adding data of one or more types to the event information, for example, configuration items, service mappings, component dependency, configuration item relationships, topology, and/or customer journey definitions. Enriching the event information may improve the context and/or formatting of the event information that is received and being processed by event pipeline 210.

In various embodiments, enriching the event information, and/or any other aspect of processing event information by data pipeline 210 (e.g., data validation, normalization, enrichment, data quality, and/or the like) may comprise comparing the recently received event information with associated event information (i.e., event information associated with the received event information) and/or historical event information (step 256), for example, stored in event database 130. Such comparison may be conducted by the enrichment microservice, or a system outside of event pipeline 210 and/or event platform 200. In various embodiments, the recently received event information may comprise data characteristics and/or identifiers to identify certain characteristics of the event information. In various embodiments, one or more of the data characteristics or identifiers comprised in the received event information may be compared with the associated event information and/or historical event information, and event characteristics comprised therein. For example, the event information may comprise a source identifier (e.g., identifying the server, system, entity, or the like) identifying the event source 110 from which the event information was received. The source identifier of the received event information may be compared with the source identifiers associated with associated event information and/or historical event information (these source identifiers being the event characteristics). In response to a match between one or more data characteristics of the received event information with one or more data characteristics of the associated event information and/or historical event information (step 258), the received event information may be enriched. Multiple data characteristics of the received event information (e.g., associated with one event) may be compared and/or matched with those of the associated event information and/or historical event information.

Enriching the event information (step 260) may comprise filling in empty fields within the event information associated with an event, and/or augmenting the event information by including additional data points. The additional data points may be, for example, configuration items, service mappings, component dependency, configuration item relationships, topology, and/or customer journey definitions for the event information. The inclusion of such additional data points in the event information may improve the context and/or formatting of the event information that is received and being processed by event pipeline 210. In various embodiments, the added data to the event information associated with an event during data enrichment may be based on the match between the event information and the associated event information and/or historical event information. That is, in response to one or more data characteristics of the event information matching one or more data characteristics of associated and/or historical event information, enrichment microservice may add data points associated with the matched associated and/or historical event information that is missing from the received event information, or update data that is out of date or inaccurate.

The enrichment of event information, as described herein, may be performed periodically, either automatically or as requested by a user of event platform 200 and/or event pipeline 210. Therefore, as enrichment data (e.g., the additional data points added to event information) is updated and/or increased in quality or accuracy over time, such enrichment data may be used for further and continuously (e.g., periodically) enrich event information.

In various embodiments, analysis system 216, and/or a system external to event pipeline 210 and/or event platform 200, may analyze the event information (e.g., the received event information, the normalized event information, and/or the enriched event information) for desired characteristics (step 262). Desired characteristics of the event information may be data characteristics of the event information (e.g., data format, a file size, data quality, data reliability, event type, data source, arrival time, arrival frequency, and/or the like) in which a user of event platform 200 and/or event pipeline 210 may be interested. Analysis system 216 and/or an external system may analyze the event information for the desired characteristic(s) (e.g., by searching for and identifying markers or identifiers in the event information that indicate the desired characteristics), and produce visual depictions (e.g., charts, graphs, numbers) of the results of such analysis on a display screen on web client 120, for example (i.e., display values determined for the desired characteristics (step 266)). For example, analysis system 216 and/or an external system may analyze the event information and determine a value representing how many events are related to transactions between a merchant and a consumer and display the results (e.g., the determined value). Analysis system 216 and/or an external system may go further, and determine values for other desired characteristics of the event characteristics, such as the goods or services transacted, monetary amount exchanged, time, date, and location of transaction, etc. Any or all of these determined values, and/or the aggregate values from analyzing event information associated with multiple events, may be displayed to a user of event platform 200 and/or event pipeline 210.

In various embodiments, a data quality assessment microservice may assess and determine the data quality of the event information (step 264) in event pipeline 210 one or more times during event information processing. For example, the data quality assessment microservice may detect the data quality of newly received event information (e.g., before and/or after normalization by the normalization microservice), and/or the data quality of enriched event information. Data quality may be determined by detecting how much data (e.g., how any data points) within the event information associated with an event are present. In various embodiments, data quality may be determined at the event level (e.g., all event information associated with an event) and/or the event field level (e.g., a piece or element of data comprised in event information). Each data element (field) on the event payload can have a score applied, and/or the entire event and associated event information may have a composite score applied. Data element scoring can be based on the presence or absence of data. Event level scoring may be an aggregate of the scores from the individual data elements. Additionally, the event data elements can be given a user defined "weighting," so the scoring may vary based on this weighting. In various embodiments, the data quality may be rated (i.e., scored) on a scale, for example, from zero to one. The data quality assessment microservice and/or event pipeline 210 may comprise a quality score threshold, which the quality score associated with event information must exceed in order for event pipeline 210 to continue processing. For example, using the confidence score scale of zero to one discussed above, the confidence score threshold may be set at 0.2 for pre-enrichment and 0.7 for pos-enrichment event information. Therefore, any event information that has not been enriched must receive a quality score from data quality assessment microservice of at least 0.2 (e.g., or the event information may be discarded) to be processed within event pipeline 210. Similarly, continuing with the example, any enriched event information must receive a quality score from data quality assessment microservice of at least 0.7 (e.g., or the event information may be discarded) to be processed within event pipeline 210.

In various embodiments, after one or more microservices 212 have processed the received event information, event platform 200 and/or event pipeline 210 may transmit the event information to data recipient 140 (step 268), for example via the dispatch microservice. The transmitted event information may be normalized, enriched, and/or analyzed event information. Data recipient 140 may receive the event information for processing, analysis, or other use. In various embodiments, event platform 200 and/or event pipeline 210 may send event information to multiple data recipients 140.

As discussed above, certain event information (e.g., from certain event sources 110) may require the processing and function of less than all available microservices 212. Accordingly, a configuration of microservices 212 may be selected and implemented (step 270) for processing certain event information. For example, in a microservices configuration for a newly integrated event source 110, to make sure that event pipeline 210 is processing the event information received therefrom correctly, only the first processing step (e.g., event information ingestion by ingestion microservice) may be performed, or, additionally or alternatively, the second processing step (e.g., event information normalization by normalization microservice) may be performed, and the other microservices may be deactivated. As another example, event information from a certain event source 110 may not require enrichment, so the enrichment microservice may be deactivated in the desired microservices configuration, while the other microservices (e.g., the ingestion, normalization, and data quality assessment microservices) are left activated to process the event information. As yet another example, first event information may be received and may be processed by event pipeline 210 with a first configuration of microservices (e.g., with certain microservices activated and deactivated). Subsequently, second event information may be received and may be processed by event pipeline 210 with a second configuration of microservices (e.g., with a different combination of microservices activated and deactivated than the first configuration of microservices). In various embodiments, in response to receiving event information, event pipeline 210 (or any components therein) may determine if there is a certain configuration of microservices by which event pipeline 210 will process the received event information.

With microservices 212 being discrete components or systems within event pipeline 210, configurations of necessary microservices 212 may be implemented for processing of different event information, thus allowing more efficient processing of various forms of event information (e.g., relating to different events, coming from different event sources 110, etc.). In various embodiments, event pipeline 210 may toggle between configurations of activated/deactivated microservices 212 (e.g., switch between a configuration with only the ingestion microservice activated, and a second configuration with all available microservices activated).

In various embodiments, event platform 200 and/or event pipeline 210 may provide a practical implementation by analyzing event information to determine the functional health of systems external to event platform 200 (e.g., the systems of event sources 110). In response to detecting a problem through the analysis of event information (e.g., the event information from an event source 110 indicates that processing time is slow, a system is not operating correctly, or the like), event platform 200 and/or event pipeline 210 may send an alert of, and/or an action item for, the problem to an data recipient 140, which may remedy the issue. An action item may comprise instructions on how to remedy a problem. In various embodiments, event platform 200 and/or event pipeline 210 may comprise a machine learning engine (e.g., comprised in analysis system 216, or any other suitable location). The machine learning engine may be configured to monitor problems and the resulting remedies, and continually learn to identify problems with the functional health of a system (e.g., event source 110) and the associated solution. In various embodiments, the machine learning engine may be configured to identify a problem and necessary solution, and automatically implement such a solution. Therefore, the solution to a problem may not require manual interference, and can simply be resolved automatically. The normalization of incoming event information may facilitate greater efficiency in event platform 200, analysis system 216, and/or the machine learning engine identifying problems and solutions because all normalized event information will comprise the same format. Therefore, detecting and identifying problems and solutions may comprise utilization of the same models and/or parameters, allowing uniform methods of problem identification and resolution.

The methods and systems described herein improve the functioning of a computer, network, platform, data processing and/or operating environment (e.g., including a network(s), database(s), node(s), etc.), and/or the like. Such an environment may include one or more parties in (electronic) communication with one another, thus improving the efficiency of their interactions. For example, event pipeline 210 normalizing event information received from event sources 110 allows greater efficiency in processing data (i.e., event information) because the processing models and/or parameters may remain the same or similar regarding of the source of event information. Furthermore, event pipeline 210 performing the processing described herein in one place (within event pipeline 210), contributes to the discussed processing efficiency. Additionally, event platform 200, event pipeline 210, analysis system 216, and/or the machine learning engine may allow the ability to automatically identify and/or resolve detected problems in data systems. That way, manual resources may not be required to monitor and remedy any issues within system 100, or within systems in communications with system 100.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) an event, (ii) event information, and/or (iii) an event source. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Referring now to FIG. 2 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 2, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams, and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

As used herein, the term "network" includes any cloud, cloud computing system, or electronic communications system or method which incorporates hardware and/or software components. Communication among the parties may be accomplished through any suitable communication channels such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

A "consumer profile" or "consumer profile data" may comprise any information or data about a consumer that describes an attribute associated with the consumer (e.g., a preference, an interest, demographic information, personally identifying information, and the like).

The phrases consumer, customer, user, account holder, account affiliate, cardmember, or the like shall include any person, entity, business, government organization, business, software, hardware, or machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, the term "end user," "consumer," "customer," "cardmember," "business," or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "business" or "merchant" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an on-line merchant, or the like.

The terms "payment vehicle," "transaction account," "financial transaction instrument," "transaction instrument", and/or the plural form of these terms may be used interchangeably throughout to refer to a financial instrument. Phrases and terms similar to "transaction account" may include any account that may be used to facilitate a financial transaction.

Phrases and terms similar to "merchant," "supplier" or "seller" may include any entity that receives payment or other consideration. For example, a supplier may request payment for goods sold to a buyer who holds an account with a transaction account issuer.

What is claimed is:

1. A method, comprising
   receiving, by a processor via an ingestion microservice of an event pipeline, event information for a plurality of events from a plurality of data sources;
   determining, by the processor, a microservices configuration in response to receiving the event information, the microservices configuration being based at least in part on the event information received and the microservices configuration specifying a combination of a normalization microservice, an enrichment microservice, and a dispatch microservice to use in the event pipeline;
   implementing, by the processor, the microservices configuration in which at least one of the normalization microservice, the enrichment microservice, or the dispatch microservice can be deactivated, such that the event pipeline may not perform functions of the deactivated at least one of the ingestion microservice, the normalization microservice, the enrichment microservice, or the dispatch microservice;
   normalizing, by the processor via a normalization microservice event pipeline, the event information for each event of the plurality of events into a desired format by at least one of changing a field name of the event information or transforming at least one value in the event information into a recognized value;
   enriching, by the processor via an enrichment microservice, the event information for each event of the plurality of events by adding additional data points associated with the event information to the event information; and
   transmitting, by the processor via a dispatch microservice, the enriched event information to a data recipient.

2. The method of claim 1, wherein the desired format is a common format for normalized event information.

3. The method of claim 1, further comprising:
   analyzing, by the processor, the enriched event information for each event of the plurality of events for desired characteristics of the enriched event information for each event; and
   displaying, by the processor, values for the desired characteristics in response to the analyzing the enriched event information for the desired characteristics.

4. The method of claim 1, further comprising
   comparing, by the processor, the event information for each event of the plurality of events to historical event information associated with the event information.

5. The method of claim 4, further comprising matching, by the processor, a data characteristic of the event information for each event of the plurality of events with a historical event characteristic of a historical event comprised in the historical event information.

6. The method of claim 5, wherein the historical event information matched with the event information is comprised in the additional data points added to the event information in the enriching the event information for each event of the plurality of events.

7. The method of claim 1, further comprising:
   determining, by the processor, an ingestion data quality score for the received event information for each event of the plurality of events prior to the normalizing the event information; and
   determining, by the processor, an enrichment data quality score for the enriched event information for each event of the plurality of events.

8. An article of manufacture including a non-transitory, tangible computer readable storage medium having instructions stored thereon that, in response to execution by a processor of a processing machine, cause the processor to perform operations comprising:

receiving, by the processor via an ingestion microservice of an event pipeline, event information for a plurality of events from a plurality of data sources;

determining, by the processor, a microservices configuration in response to receiving the event information, the microservices configuration being based at least in part on the event information received and the microservices configuration specifying a combination of a normalization microservice, an enrichment microservice, and a dispatch microservice to use in the event pipeline;

implementing, by the processor, the microservices configuration in which at least one of the normalization microservice, the enrichment microservice, or the dispatch microservice can be deactivated, such that the event pipeline may not perform functions of the deactivated at least one of the ingestion microservice, the normalization microservice, the enrichment microservice, or the dispatch microservice;

normalizing, by the processor via a normalization microservice event pipeline, the event information for each event of the plurality of events into a desired format by at least one of changing a field name of the event information or transforming at least one value in the event information into a recognized value;

enriching, by the processor via an enrichment microservice, the event information for each event of the plurality of events by adding additional data points associated with the event information to the event information; and transmitting, by the processor via a dispatch microservice, the enriched event information to a data recipient.

9. The article of claim 8, wherein the desired format is a common format for normalized event information.

10. The article of claim 8, wherein the operations further comprise:

analyzing, by the processor, the enriched event information for each event of the plurality of events for desired characteristics of the enriched event information for each event; and displaying, by the processor, values for the desired characteristics in response to the analyzing the enriched event information for the desired characteristics.

11. The article of claim 8, wherein the operations further comprise comparing, by the processor, the event information for each event of the plurality of events to historical event information associated with the event information.

12. The article of claim 8, wherein the operations further comprise:

determining, by the processor, an ingestion data quality score for the received event information for each event of the plurality of events prior to the normalizing the event information; and determining, by the processor, an enrichment data quality score for the enriched event information for each event of the plurality of events.

13. The article of claim 8, wherein the operations further comprise matching, by the processor, a data characteristic of the event information for each event of the plurality of events with a historical event characteristic of a historical event comprised in the historical event information.

14. The article of claim 13, wherein the historical event information matched with the event information is comprised in the additional data points added to the event information in the enriching the event information for each event of the plurality of events.

15. A system comprising:

a processor of a processing machine; and a tangible, non-transitory memory configured to communicate with the processor, the tangible, non-transitory memory having instructions stored thereon that, in response to execution by the processor, cause the processor to perform operations comprising:

receiving, by the processor via an ingestion microservice of an event pipeline, event information for a plurality of events from a plurality of data sources;

determining, by the processor, a microservices configuration in response to receiving the event information, the microservices configuration being based at least in part on the event information received and the microservices configuration specifying a combination of a normalization microservice, an enrichment microservice, and a dispatch microservice to use in the event pipeline;

implementing, by the processor, the microservices configuration in which at least one of the normalization microservice, the enrichment microservice, or the dispatch microservice can be deactivated, such that the event pipeline may not perform functions of the deactivated at least one of the ingestion microservice, the normalization microservice, the enrichment microservice, or the dispatch microservice;

normalizing, by the processor via a normalization microservice event pipeline, the event information for each event of the plurality of events into a desired format by at least one of changing a field name of the event information or transforming at least one value in the event information into a recognized value;

enriching, by the processor via an enrichment microservice, the event information for each event of the plurality of events by adding additional data points associated with the event information to the event information; and transmitting, by the processor via a dispatch microservice, the enriched event information to a data recipient.

16. The system of claim 15, wherein the desired format is a common format for normalized event information.

17. The system of claim 15, wherein the operations further comprise:

analyzing, by the processor, the enriched event information for each event of the plurality of events for desired characteristics of the enriched event information for each event; and displaying, by the processor, values for the desired characteristics in response to the analyzing the enriched event information for the desired characteristics.

18. The system of claim 15, wherein the operations further comprise comparing, by the processor, the event information for each event of the plurality of events to historical event information associated with the event information.

19. The system of claim 18, wherein the operations further comprise matching, by the processor, a data characteristic of the event information for each event of the plurality of events with a historical event characteristic of a historical event comprised in the historical event information.

20. The system of claim 19, wherein the historical event information matched with the event information is comprised in the additional data points added to the event information in the enriching the event information for each event of the plurality of events.

* * * * *